United States Patent
Gambhir et al.

(10) Patent No.: US 9,703,785 B2
(45) Date of Patent: *Jul. 11, 2017

(54) DYNAMICALLY UPDATING CONTENT IN A LIVE PRESENTATION

(71) Applicant: International Business Machines Corporation, Armonk, NY (US)

(72) Inventors: Kapil Gambhir, New Delhi (IN); Jaspreet Singh, Delhi (IN); Jianjun Zhang, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 255 days.

This patent is subject to a terminal disclaimer.

(21) Appl. No.: 14/106,492

(22) Filed: Dec. 13, 2013

(65) Prior Publication Data

US 2015/0169748 A1  Jun. 18, 2015

(51) Int. Cl.
*G06F 17/30* (2006.01)
*G06F 3/0481* (2013.01)

(52) U.S. Cl.
CPC ...... *G06F 17/30056* (2013.01); *G06F 3/0481* (2013.01); *G06F 17/30861* (2013.01)

(58) Field of Classification Search
USPC .................................................. 707/608, 758
See application file for complete search history.

(56) References Cited

U.S. PATENT DOCUMENTS

| | | | | |
|---|---|---|---|---|
| 7,386,871 B1* | 6/2008 | Knudson | ............. | H04N 21/235 375/E7.024 |
| 8,122,341 B1* | 2/2012 | Dayan | ................. | G06Q 10/101 701/532 |
| 8,595,763 B1* | 11/2013 | Packard | ................. | H04N 7/025 725/108 |
| 9,135,234 B1* | 9/2015 | Mattos | ..................... | G06F 17/25 |
| 9,253,223 B1* | 2/2016 | Cushing | ............. | H04L 65/4038 |
| 2003/0034999 A1* | 2/2003 | Coughlin, III | ........... | G09B 7/00 715/738 |
| 2003/0217334 A1* | 11/2003 | Liu | ................... | G06F 17/30011 715/255 |
| 2004/0002049 A1* | 1/2004 | Beavers | ................... | G09B 5/00 434/350 |

(Continued)

FOREIGN PATENT DOCUMENTS

WO 2013049907 A1 4/2013

OTHER PUBLICATIONS

"Dynamic Presentation Modification Based on Real-time Comments", An IP.com Prior Art Database Technical Disclosure, Authors et. al.: Disclosed Anonymously, IP.com No. IPCOM000212436D, IP.com Electronic Publication: Nov. 14, 2011.

(Continued)

*Primary Examiner* — Cam-Linh Nguyen
(74) *Attorney, Agent, or Firm* — Maeve Carpenter (57) ABSTRACT

A method for dynamically updating content in a live presentation. The method includes a computer processor determining a first content of a live presentation. The computer processor monitors a plurality of data sources and determines at least one of the plurality of data sources includes the first content and a second content. The computer processor retrieves information related to the second content. The computer processor then updates the live presentation with the information related to the second content.

10 Claims, 4 Drawing Sheets

(56) References Cited

U.S. PATENT DOCUMENTS

| | | | |
|---|---|---|---|
| 2006/0031283 A1* | 2/2006 | Tuttle | H04L 45/306 709/203 |
| 2006/0041681 A1* | 2/2006 | Rumelhart | H04L 45/30 709/238 |
| 2006/0075348 A1* | 4/2006 | Xu | G06F 3/0481 715/730 |
| 2006/0242596 A1* | 10/2006 | Armstrong | G06F 3/0485 715/786 |
| 2007/0050519 A1* | 3/2007 | Cano | H04L 67/1095 709/238 |
| 2008/0065673 A1* | 3/2008 | Yuhara | G01C 21/3484 |
| 2008/0275881 A1* | 11/2008 | Conn | G06F 17/30056 |
| 2008/0320413 A1* | 12/2008 | Oshiro | G06F 3/0481 715/792 |
| 2009/0144785 A1* | 6/2009 | Walker | G11B 27/034 725/105 |
| 2009/0262137 A1* | 10/2009 | Walker | H04H 60/04 345/629 |
| 2010/0153213 A1 | 6/2010 | Pomplun et al. | |
| 2010/0228874 A1 | 9/2010 | Rajan | |
| 2010/0257457 A1* | 10/2010 | De Goes | H04L 65/1093 715/751 |
| 2011/0112899 A1 | 5/2011 | Strutton et al. | |
| 2011/0276513 A1 | 11/2011 | Erhart et al. | |
| 2012/0166289 A1* | 6/2012 | Gadoury | G06Q 30/0269 705/14.66 |
| 2012/0242695 A1* | 9/2012 | Martin | G09C 5/00 345/633 |
| 2012/0284755 A1* | 11/2012 | Keret | H04N 21/6181 725/62 |
| 2013/0132852 A1* | 5/2013 | Sommer | G06Q 10/103 715/736 |
| 2013/0198774 A1 | 8/2013 | Massicotte et al. | |
| 2013/0227596 A1* | 8/2013 | Pettis | H04N 21/2353 725/13 |
| 2013/0311595 A1* | 11/2013 | Milatinovici | H04N 21/26275 709/214 |
| 2013/0346868 A1* | 12/2013 | Scherpa | G06F 3/01 715/730 |
| 2014/0062696 A1* | 3/2014 | Packard | G06Q 10/063 340/540 |
| 2014/0081613 A1* | 3/2014 | Dommisse | G01V 1/345 703/10 |
| 2014/0095668 A1* | 4/2014 | Oyman | H04W 76/046 709/219 |
| 2014/0365918 A1* | 12/2014 | Caldwell | G06F 3/0481 715/753 |
| 2014/0372908 A1* | 12/2014 | Kashi | H04L 65/403 715/753 |
| 2015/0199374 A1* | 7/2015 | Bottner | G06F 17/30165 707/608 |

OTHER PUBLICATIONS

"Method and System for Dynamically Altering Content and Structure of a Presentation Based on Audience Reaction", An IP.com Prior Art Database Technical Disclosure, Authors et. al.: Disclosed Anonymously, IP.com No. IPCOM000219148D, IP.com Electronic Publication: Jun. 22, 2012.

U.S. Appl. No. 14/302,061, filed Jun. 11, 2014. This Reference is Not Included Because it is Readily Available to the Examiner.

* cited by examiner

DYNAMICALLY UPDATING CONTENT IN A LIVE PRESENTATION

FIELD OF THE INVENTION

The present invention relates generally to the field of data processing and management, and more particularly to dynamically updating content in a live presentation based on detection of real-time data.

BACKGROUND OF THE INVENTION

During a live presentation of content, such as during an educational or training session presentation, webinar, or other broadcast, a presenter or speaker is limited to the information and content she prepared for the session. Often, the audience feedback or reaction could influence the structure or flow of the presentation, however, this feedback is usually not tapped into by the presenter or speaker. As such, the information and content is not modified after the live presentation has started, and the presenter cannot keep the feedback in mind which could tremendously improve the effectiveness of the presentation of the content. Additionally, there are often comments, questions, and concerns regarding the presented information and content discussed in message boards, chat rooms, social media, and other internet sources that a presenter or speaker can not view until after the presentation is completed. Even if these internet sources are made available to the speaker, they are usually addressed by verbal speaker response, with no update to the prepared content of the presentation.

SUMMARY

Embodiments of the present invention disclose a method, computer program product, and computer system for dynamically updating content in a live presentation. In an embodiment, a computer processor determines a first content of a live presentation. The computer processor monitors a plurality of data sources and determines at least one of the plurality of data sources includes the first content and a second content. The computer processor retrieves information related to the second content. The computer processor then updates the live presentation with the information related to the second content.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
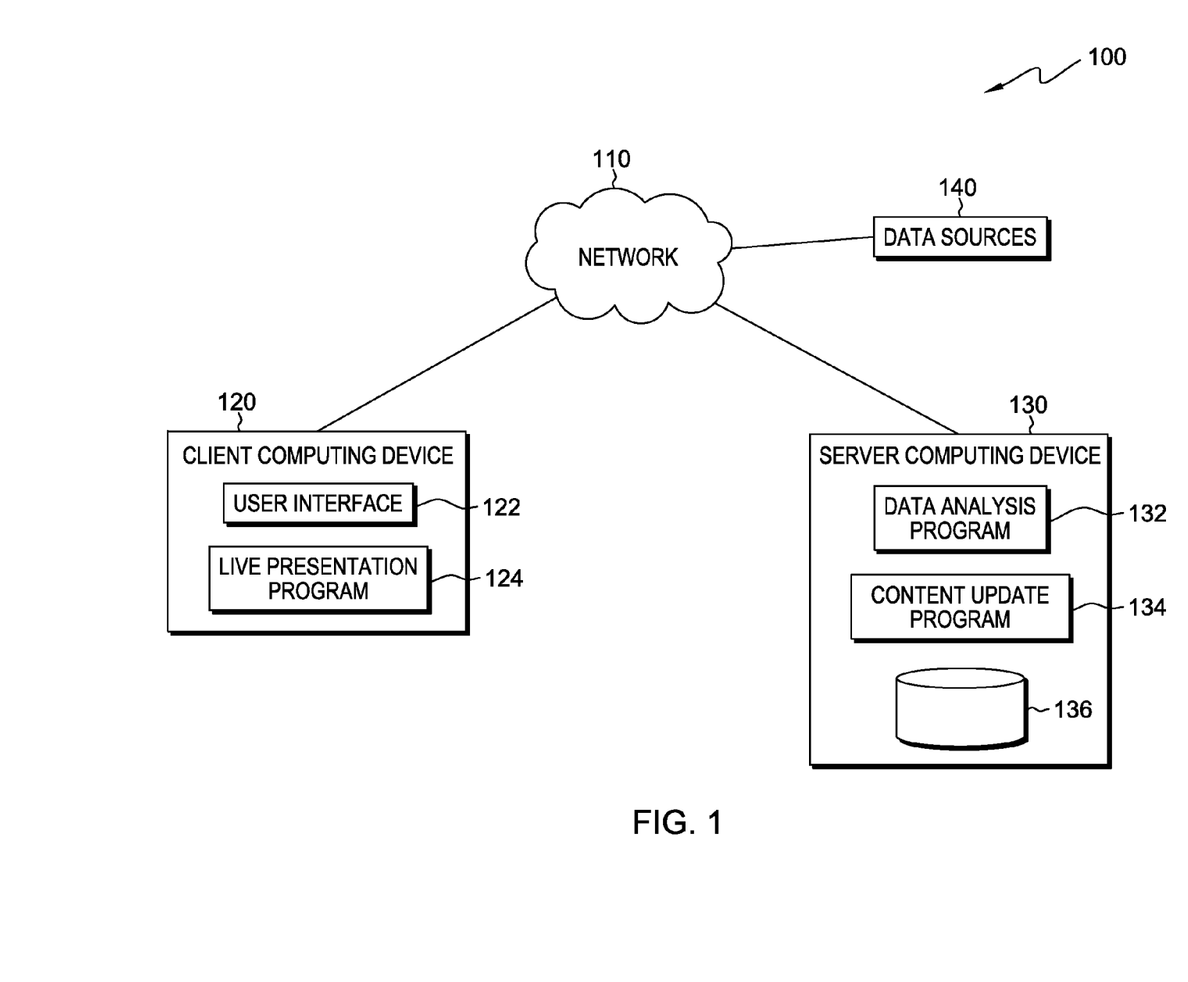
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention.

Distributed data processing environment 100 includes client computing device 120, server computing device 130, and data sources 140, all interconnected via network 110. Network 110 may be a local area network (LAN), a wide area network (WAN), such as the Internet, a cellular data network, any combination thereof, or any combination of connections and protocols that will support communication between client computing device 120, server computing device 130, and data sources 140 in accordance with embodiments of the present invention. Network 110 may include wired, wireless, or fiber optic connections.

Client computing device 120 may be a laptop computer, a tablet computer, a netbook computer, a personal computer (PC), a personal digital assistant (PDA), a smart phone, or any programmable electronic device capable of communicating with server computing device 130 and data sources 140 via network 110. Client computing device 120 may represent multiple computing devices capable of communicating with each other, and with server computing device 130 and data sources 140, via network 110, for example, as in an education or training environment. Client computing device 120 includes user interface (UI) 122 and live presentation program 124. UI 122 may be, for example, a graphical user interface (GUI) or a web user interface (WUI) and can display documents, web browser windows, user options, instructions for operations, videos, images, and other instruments containing data. In an exemplary embodiment of the present invention, UI 122 can display data and content delivered during live presentations, webinars, and broadcasts to client computing device 120 using live presentation program 124. Live presentation program 124 includes any presentation, lecture, webinar, broadcast, demonstration, or program that delivers live content and information displayed through UI 122. Live presentation program 124 may be operated by a user of client computing device 120, or by a user operating within distributed data processing environment 100 and accessing live presentation program 124 via network 110.

Server computing device 130 may be a laptop computer, a tablet computer, a netbook computer, a personal computer (PC), a personal digital assistant (PDA), a smart phone, or any programmable electronic device capable of communicating with client computing device 120 and data sources 140 via network 110. Server computing device 130 may be a management server, a web server, or may represent a computing system utilizing clustered computers and components to act as a single pool of seamless resources when accessed through a network, such as network 110. Server computing device 130 may include internal and external components, as depicted and described in further detail with respect to FIG. 5.

Server computing device 130 includes data analysis program 132, content update program 134, and database 136. Data analysis program 132 receives an indication that a live presentation started, such as a webinar presented via network 110 to a user of client computing device 120, and determines content of the live presentation. Data analysis program 132 monitors data sources, including live message boards, discussions, and live and virtual chats, in order to detect when a discussion contains content related to the content of the live presentation. Data analysis program 132 detects various available real-time data, which may not be explicitly solicited from an audience. Data analysis program 132 then analyzes any related content and issues keywords corresponding to the related content to content update program 134. Content update program 134 receives the keywords from data analysis program 132 and uses the keywords to retrieve associated content from database 136. Content update program 134 incorporates the associated content from database 136 into the live presentation, for example, by sending the associated content to live presentation program 124 on client computing device 120. Database 136 stores content for live delivery. Information in database 136 can be indexed and organized by keyword, or indexed based on various attributes of the content. In an alternate embodiment of the present invention, data analysis program 132 and content update program 134 may be located each on a separate server computing device 130. While in FIG. 1, database 136 is shown within server computing device 130, in various embodiments of the present invention, database 136 may be located elsewhere in distributed data processing environment 100 and can communicate with live presentation program 124 and content update program 134 through network 110.

Data sources 140 are any social channel, website, chat room, or live chat containing real-time discussions occurring concurrent with a presentation, including for example a webinar or broadcast, presented via live presentation program 124. Data sources 140 can include message boards, social network programs, such as Twitter™ or Facebook™, and other online discussion forums where information is available within moments after a user keys in the text or enters text. Data sources 140 can also include live or virtual chats that may or not be private, such as chats taking place within an educational or training session classroom or via an online chat room. In an embodiment, discussions taking place within an educational session classroom may be recorded and transcribed using speech to text technology for access by data analysis program 132. Data sources 140 may represent a database, or one or more computing devices, such as a web server, located within distributed data processing environment 100 and accessible via network 110.

Figure 2:
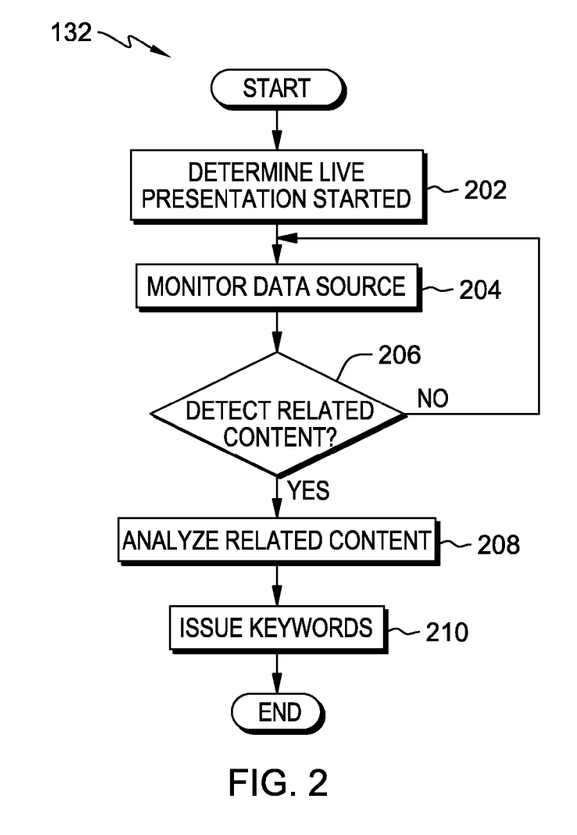
FIG. 2 is a flowchart depicting operational steps of a data analysis program for monitoring multiple real-time data sources for content related to content in a live presentation and analyzing the related content, in accordance with an embodiment of the present invention.

FIG. 2 is a flowchart depicting operational steps of a data analysis program for monitoring multiple real-time data sources for content related to content in a live presentation and analyzing the related content, in accordance with an embodiment of the present invention.

Data analysis program 132 determines a live presentation started within distributed data processing environment 100 (step 202). In an exemplary embodiment of the present invention, data analysis program 132 receives an indication from live presentation program 124 that a presentation, for example, a new product announcement, has started and determines content, or subject matter, of the live presentation. An indication that a live presentation has started, and information regarding the content of the live presentation, may also be sent by an operator or presenter to data analysis program 132.

Data analysis program 132 monitors data sources (step 204). Following the above example, during a new product announcement, social media sites and technology message boards often contain discussions about the product announcement, including opinions, questions, and reviews. Data analysis program 132 monitors data sources, such as an internet message board of data sources 140, during the live presentation for mention of specific content related to the content of the live presentation.

Data analysis program 132 determines if any related content is detected (decision block 206). If data analysis program 132 does not detect any related content (decision block 206, "no" branch), data analysis program 132 continues to monitor data sources (step 204). If data analysis program 132 detects related content in any of data sources 140 (decision block 206, "yes" branch), data analysis program 132 analyzes the related content (step 208). Data analysis program 132 utilizes known analytics engines to mine and analyze related content in order to determine trends, and relevant information, and to filter out noise, or irrelevant discussions. For example, an announcement is being made during a live presentation about a new smart phone, and an audience chatting in an online discussion forum is curious about USB support. Data analysis program 132 detects that the conversation is about the smart phone announcement, and the related USB support question. Data analysis program 132 determines keywords, attributes, or tags of the detected related content.

Data analysis program 132 issues keywords (step 210). Based on the determined keywords, attributes, or tags, data analysis program 132 issues keywords that can then be used to retrieve information from database 136. In an exemplary embodiment of the present invention, data analysis program 132 issues keywords to content update program 134. In an alternate embodiment, data analysis program 132 can use the issued keywords to retrieve updated information directly from database 136. In the alternate embodiment, data analysis program 132 can then send the updated information to content update program 134 or directly to live presentation program 124.

Figure 3:
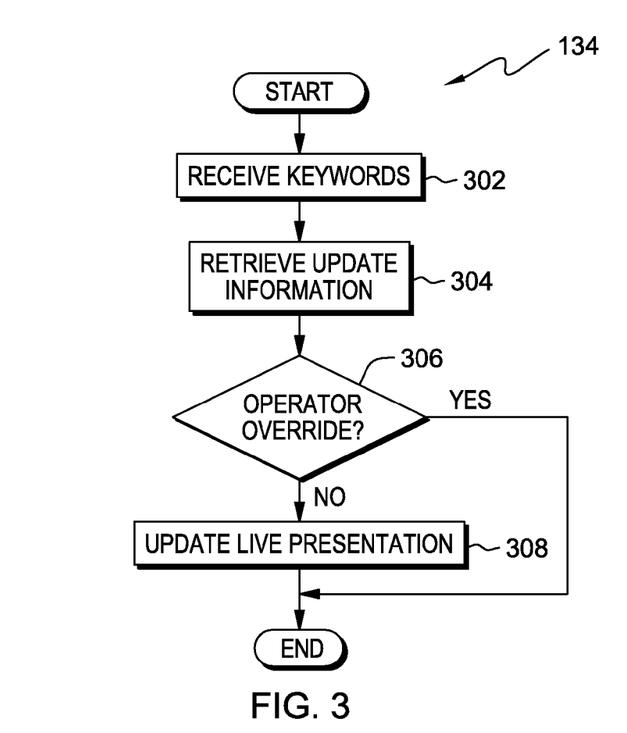
FIG. 3 is a flowchart depicting operational steps of a content update program for retrieving related content information and updating a live presentation with the related content information, in accordance with an embodiment of the present invention.

FIG. 3 is a flowchart depicting operational steps of content update program 134 for retrieving updated information and updating a live presentation with the updated information, in accordance with an embodiment of the present invention.

Content update program 134 receives keywords (step 302) and retrieves updated information (step 304). Content update program 134 retrieves updated information from database 136 corresponding to the keywords issued by data analysis program 132. Updated information may include a new presentation slide, a prepared paragraph or sentence for a speaker, or an answer to a question posed in one or more of data sources 140. For example, using the smart phone announcement example from above, content update program 134 determines if there is USB related information available in database 136, and if so, that information is retrieved.

In an alternate embodiment of the present invention, content update program 134 can receive keywords corresponding to the detected related content, and determine if the content is currently available in the live presentation. If the detected related content is available, content update program 134 presents the available information to the operator or presenter.

Content update program 134 determines if an operator has overridden the content update (decision block 306). In an exemplary embodiment of the present invention, an operator or presenter can determine not to update the live presentation with updated information. If content update program 134 determines an operator has overridden the content update (decision block 306, "yes" branch), content update program 134 cancels the update of the live presentation and ends. In the alternate embodiment of the present invention, an operator or presenter can determine not to receive or address the presented information corresponding to the detected related content that is currently available. If content update program 134 determines an override request is not received (decision block 306, "no" branch), content update program 134 updates the live presentation (step 308). In various embodiments of the present invention, the updated information might be such that the original content of the live presentation is not presented, but is instead replaced with the updated information.

Figure 4:
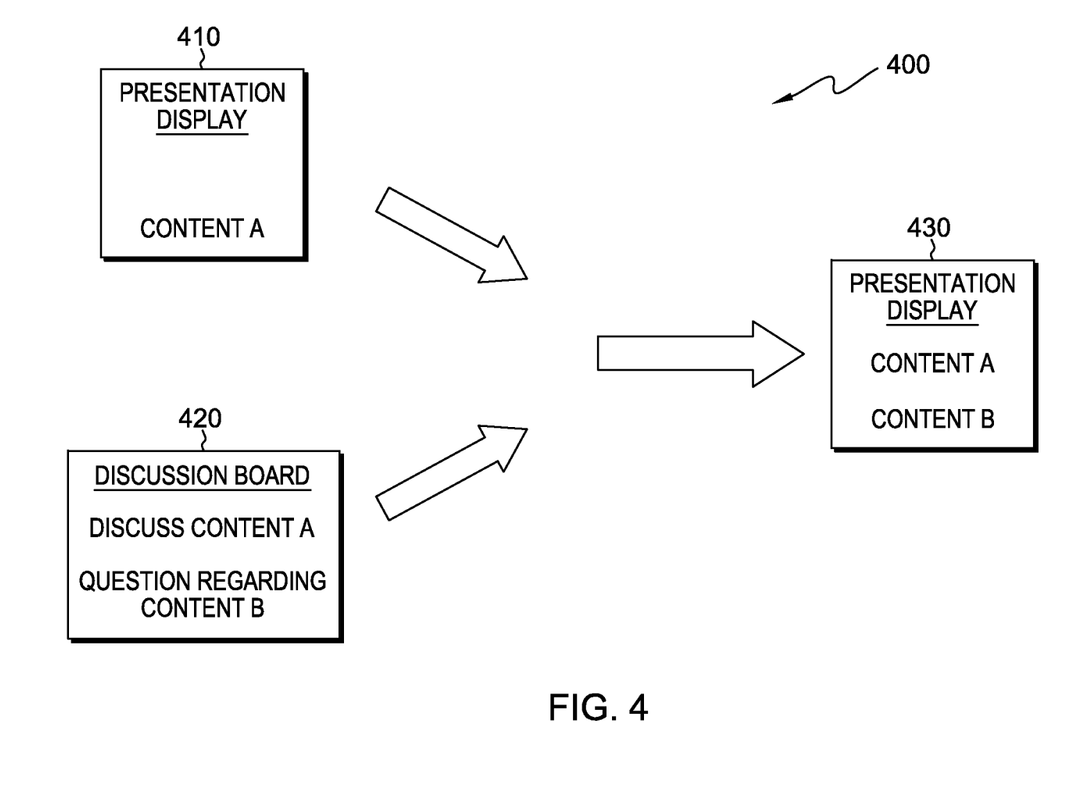
FIG. 4 depicts an exemplary flow based on operation of the data analysis program of FIG. 2 and the content update program of FIG. 3, in accordance with an embodiment of the present invention.

FIG. 4 depicts an exemplary flow based on operation of data analysis program 132 and content update program 134, in accordance with an embodiment of the present invention. Presentation display 410 represents an exemplary slide displayed in a live presentation, for example, through UI 122 on client computing device 120. Presentation display 410 includes "content A." Discussion board 420 is an exemplary data source 140 containing discussion of "content A" and additionally, a question about a "content B." Based on the content in the live presentation on presentation display 410, data analysis program 132 monitors data sources, such as discussion board 420, for content related to the content in presentation display 410. Upon detecting related content, data analysis program 132 issues keywords associated with the related content to content update program 134. Content update program 134 retrieves updated information using the issued keywords from database 136 and updates the live presentation, either with updates to current presentation display 410, or in a future presentation display, for example, in presentation display 430. Presentation display 430 depicts an exemplary slide with updated information, shown with the original "content A" from the live presentation, and updated to include "content B," which was a question posed in discussion board 420. Presentation display 430 may also include only "content B" when updated.

Figure 5:
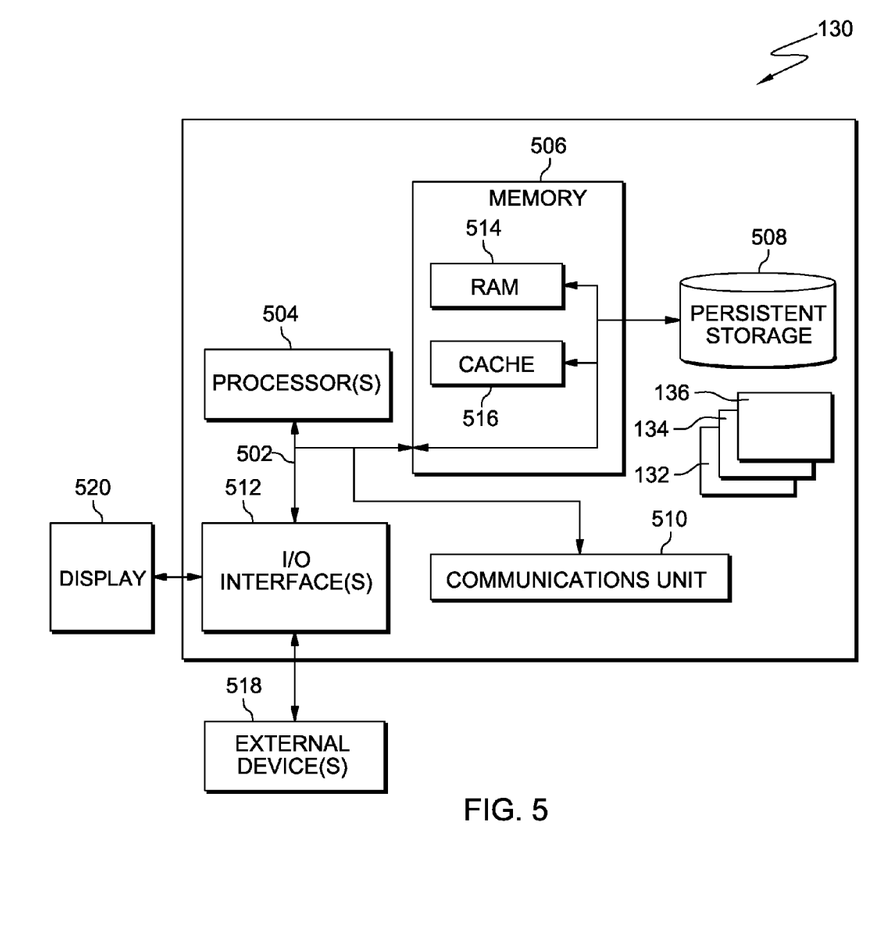
FIG. 5 depicts a block diagram of components of a data processing system, such as the server computing device of FIG. 1, in accordance with an embodiment of the present invention.

FIG. 5 depicts a block diagram of components of server computing device 130 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computing device 130 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Data analysis program 132, content update program 134, and database 136 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including client computing device 120 and data sources 140. In these examples, communications unit 510 includes one or more network interface cards. Communications unit 510 may provide communications through the use of either or both physical and wireless communications links. Data analysis program 132, content update program 134, and database 136 may be downloaded to persistent storage 508 through communications unit 510.

I/O interface(s) 512 allows for input and output of data with other devices that may be connected to server computing device 130. For example, I/O interface(s) 512 may provide a connection to external device(s) 518 such as a keyboard, keypad, a touch screen, and/or some other suitable input device. External device(s) 518 can also include portable computer-readable storage media such as, for example, thumb drives, portable optical or magnetic disks, and memory cards. Software and data used to practice embodiments of the present invention, e.g., data analysis program 132, content update program 134, and database 136, can be stored on such portable computer-readable storage media and can be loaded onto persistent storage 508 via I/O interface(s) 512. I/O interface(s) 512 also connect to a display 520. Display 520 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A computer program product for dynamically updating content in a live presentation, the computer program product comprising:
one or more computer-readable tangible storage media and program instructions stored on the one or more computer-readable tangible storage media, the program instructions comprising:
program instructions to determine a first content of a live presentation;
program instructions to monitor a plurality of discussion data sources, wherein the plurality of discussion data sources are external to the live presentation;
program instructions to determine at least one of the plurality of discussion data sources includes the first content and a second content, wherein the second content is related to the first content of the live presentation, and includes at least discussion of the first content;
program instructions to determine a keyword corresponding to the second content;
program instructions to retrieve, based, at least in part, on the determined keyword, a third content, wherein the third content is information associated with the second content, and wherein retrieving the third content includes program instructions to access a database storing information related to at least the first content and the second content; and
program instructions to update the live presentation with the third content.

2. The computer program product of claim 1, wherein the plurality of data sources include at least one of: an online discussion forum, a social network program, a chat room, a live chat, an internet message board, and a website.

3. The computer program product of claim 1, further comprising, prior to updating the live presentation with the information associated with the second content:
   program instructions to receive an override request; and
   program instructions to cancel the updating.

4. The computer program product of claim 1, further comprising, prior to retrieving the third content:
   program instructions to determine the live presentation contains the second content; and
   program instructions to present the second content to a presenter of the live presentation.

5. The computer program product of claim 1, wherein the program instructions to update the live presentation with the information associated with the second content, include at least one of: program instructions to update a current presentation display with the second content; and program instructions to update a future presentation display with the second content.

6. A computer system for dynamically updating content in a live presentation, the computer system comprising:
   one or more computer processors;
   one or more computer-readable tangible storage media;
   program instructions stored on the one or more computer-readable tangible storage media for execution by at least one of the one or more computer processors, the program instructions comprising:
   program instructions to determine a first content of a live presentation;
   program instructions to monitor a plurality of discussion data sources, wherein the plurality of discussion data sources are external to the live presentation;
   program instructions to determine at least one of the plurality of discussion data sources includes the first content and a second content, wherein the second content is related to the first content of the live presentation, and includes at least discussion of the first content;
   program instructions to determine a keyword corresponding to the second content;
   program instructions to retrieve based, at least in part, on the determined keyword, a third content, wherein the third content is information associated with the second content, and wherein retrieving the third content includes program instructions to access a database storing information related to at least the first content and the second content; and
   program instructions to update the live presentation with the third content.

7. The computer system of claim 6, wherein the plurality of data sources include at least one of: an online discussion forum, a social network program, a chat room, a live chat, an internet message board, and a website.

8. The computer system of claim 6, further comprising, prior to updating the live presentation with the information associated with the second content:
   program instructions to receive an override request; and
   program instructions to cancel the updating.

9. The computer system of claim 6, further comprising, prior to retrieving the third content:
   program instructions to determine the live presentation contains the second content; and
   program instructions to present the second content to a presenter of the live presentation.

10. The computer system of claim 6, wherein the program instructions to update the live presentation with the information associated with the second content, include at least one of: program instructions to update a current presentation display with the second content; and program instructions to update a future presentation display with the second content.

* * * * *